United States Patent
Jung et al.

(10) Patent No.: US 12,271,288 B2
(45) Date of Patent: Apr. 8, 2025

(54) DEVICE AND METHOD FOR OPERATING MEMORY IN ELECTRONIC DEVICE

(71) Applicant: SAMSUNG ELECTRONICS CO., LTD., Suwon-si (KR)

(72) Inventors: Jihun Jung, Suwon-si (KR); Kyeonghwan Jung, Suwon-si (KR); Changhyeon Chae, Suwon-si (KR); Jaeook Kwon, Suwon-si (KR); Jusun Song, Suwon-si (KR); Jaehoon Jeong, Suwon-si (KR); Youngho Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 191 days.

(21) Appl. No.: 18/190,350

(22) Filed: Mar. 27, 2023

(65) Prior Publication Data
US 2023/0409465 A1 Dec. 21, 2023

Related U.S. Application Data

(63) Continuation of application No. PCT/KR2023/003047, filed on Mar. 6, 2023.

(30) Foreign Application Priority Data

Jun. 17, 2022 (KR) .................. 10-2022-0074199

(51) Int. Cl.
G06F 11/36 (2006.01)
G06F 11/07 (2006.01)
G06F 11/362 (2025.01)

(52) U.S. Cl.
CPC ........ *G06F 11/3636* (2013.01); *G06F 11/076* (2013.01); *G06F 11/366* (2013.01)

(58) Field of Classification Search
CPC ... G06F 11/366; G06F 11/076; G06F 11/3636
See application file for complete search history.

(56) References Cited

U.S. PATENT DOCUMENTS 6,560,773 B1 * 5/2003 Alexander, III .... G06F 11/3466
717/128
6,658,652 B1 * 12/2003 Alexander, III ...... G06F 11/366
711/6

(Continued)

FOREIGN PATENT DOCUMENTS

| CN | 108073461 B | 1/2021 |
|---|---|---|
| JP | 2009-217617 | 9/2009 |
| KR | 10-1669762 | 10/2016 |

OTHER PUBLICATIONS

International Search Report dated Jun. 2, 2023 in International Patent Application No. PCT/KR2023/003047.

(Continued)

*Primary Examiner* — Phillip H Nguyen
(74) *Attorney, Agent, or Firm* — STAAS & HALSEY LLP

(57) ABSTRACT

A memory operation device and method for operating a memory in an electronic device. The electronic device may determine whether a memory leak occurs in one or more low-order stack trace items with a count value of n among collected stack trace items, n being a positive integer, and, based on a low-order stack trace item among the collected stack trace items being determined as causing a memory leak, proceeding to a next order of the collected stack trace items to thereby determine whether a memory leak occurs in one or more high-order stack trace items with a count value of m which is a positive integer higher than n). When m is a maximum count value among the collected stack trace items, memory debugging may be performed using a high- (Continued)

order stack trace item, among the one or more high-order stack trace items, causing the memory leak.

20 Claims, 8 Drawing Sheets

(56) References Cited

U.S. PATENT DOCUMENTS

| | | | | |
|---|---|---|---|---|
| 7,577,943 | B2 * | 8/2009 | Chilimbi | G06F 11/3636 |
| | | | | 711/170 |
| 7,991,961 | B1 | 8/2011 | Tsai et al. | |
| 8,930,661 | B2 | 1/2015 | Hashiguchi | |
| 10,725,846 | B1 | 7/2020 | Schreter | |
| 10,956,298 | B2 * | 3/2021 | Alam | G06N 3/044 |
| 11,200,148 | B2 | 12/2021 | Booth et al. | |
| 2005/0204342 | A1 | 9/2005 | Broussard | |
| 2006/0248103 | A1 | 11/2006 | Belcher | |
| 2007/0250820 | A1 * | 10/2007 | Edwards | G06F 11/3636 |
| | | | | 717/131 |
| 2008/0244547 | A1 * | 10/2008 | Wintergerst | G06F 11/3466 |
| | | | | 717/158 |
| 2010/0262954 | A1 * | 10/2010 | Roos | G06F 11/36 |
| | | | | 711/170 |
| 2020/0327040 | A1 | 10/2020 | Booth et al. | |

OTHER PUBLICATIONS

PCT/ISA/237 dated Jun. 2, 2023 in International Patent Application No. PCT/KR2023/003047.

* cited by examiner

DEVICE AND METHOD FOR OPERATING MEMORY IN ELECTRONIC DEVICE

CROSS-REFERENCE TO RELATED APPLICATIONS

This application is a continuation application, under 35 U.S.C § 111(a), of International Application No. PCT/KR2023/003047 designating the United States, filed on Mar. 6, 2023, in the Korean Intellectual Property Receiving Office, which claims priority from Korean Patent Application No. 10-2022-0074199, filed on Jun. 17, 2022, in the Korean Intellectual Property Office, the disclosures of which are hereby incorporated by reference herein in their entireties.

BACKGROUND

Field

The disclosure relates to a memory operation device and method for analyzing a cause of a memory leak in an electronic device.

Description of Related Art

In general, when an electronic device, such as a computer, smartphone or tablet, executes one or a plurality of programs, it may perform processing, such as interpretation of commands and calculation and comparison of data. The electronic device allocates and uses a memory area in a necessary size to execute one or a plurality of programs. In this case, a memory leak in which memory waste may occur in the electronic device. The memory leak may occur as an unnecessary memory area is not returned but continuously occupied, e.g., when an event, such as termination of the program running on the electronic device occurs. When the memory leak occurs, the memory area may increase without being released over time in the electronic device. The conditions where the memory leak occurs may be varied depending on the environment or context.

When an issue, such as a memory leak, occurs in the process due to execution of a specific program, memory debugging for the specific program may be performed to address the memory issue in the electronic device. For example, the programmer may treat the cause of the memory issue by performing debugging for modifying the program by analyzing stack trace (or back-trace, stack back-trace, or stack traceback) specified in the report file which is a result of profiling the memory use status in the electronic device. The debugging may include, e.g., report analysis that figures out the code requesting to allocate memory based on the stack trace information specified in the report file.

A request for excessive memory allocation may occur in an electronic device that may execute one or more processes where much traffic may occur, such as in a video streaming service, causing it difficult to normally perform the operation due to the overhead for extracting stack trace information.

SUMMARY

According to an embodiment of the disclosure, a method for operating a memory in an electronic device may comprise determining whether a memory leak occurs in one or more low-order stack trace items with a count value of n among collected stack trace items, n being a positive integer, based on a low-order stack trace item among the one or more low-order stack trace items being determined as causing the memory leak, proceeding to a next order of the collected stack trace items to thereby determine whether a memory leak occurs in one or more high-order stack trace items with a count value of m which is a positive integer higher than n. When m is a maximum count value among the collected stack trace items, memory debugging may be performed using a high-order stack trace item, among the one or more high-order stack trace items, causing the memory leak.

According to an embodiment of the disclosure, an electronic device may comprise a memory leak analysis module configured to determine whether a memory leak occurs in a stack trace item and a memory debugger configured to perform memory debugging based on a result of determining whether the memory leak occurs by the memory leak analysis module. The memory leak analysis module may be configured to determine whether a memory leak occurs in one or more low-order stack trace items with a count value of n among collected stack trace items, n being a positive integer, and, based on a low-order stack trace item among the one or more low-order stack trace items being determined as causing the memory leak, proceeding to a next order of collected stack trace items to thereby determine whether a memory leak occurs in one or more high-order stack trace items with a count value of m which is a positive integer higher than n. When m is a maximum count value among the collected stack trace items, the memory debugger may be configured to perform memory debugging using a high-order stack trace item, among the one or more high-order stack trace items, causing the memory leak.

According to an embodiment of the disclosure, an electronic device may comprise a memory including a stack area or a heap area and at least one processor configured to perform dynamic memory allocation on the memory and analyze a cause of a memory leak based on stack trace. The at least one processor may be configured to determine whether a memory leak occurs in one or more low-order stack trace items with a count value of n among collected stack trace items, n being a positive integer, and, based on a low-order stack trace item among the one or more low-order stack trace items being determined as causing the memory leak, proceeding to a next order of the collected stack trace items to thereby determine whether a memory leak occurs in one or more high-order stack trace items with a count value of m which is a positive integer higher than n. When m is a maximum count value among the collected stack trace items, memory debugging may be performed using a high-order stack trace item, among the one or more high-order stack trace items, causing the memory leak.

Effects of the present invention are not limited to the foregoing, and other unmentioned effects would be apparent to one of ordinary skill in the art from the following description. In other words, unintended effects in practicing embodiments of the disclosure may also be derived by one of ordinary skill in the art from the embodiments of the disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION OF EXEMPLARY EMBODIMENTS

Figure 1:
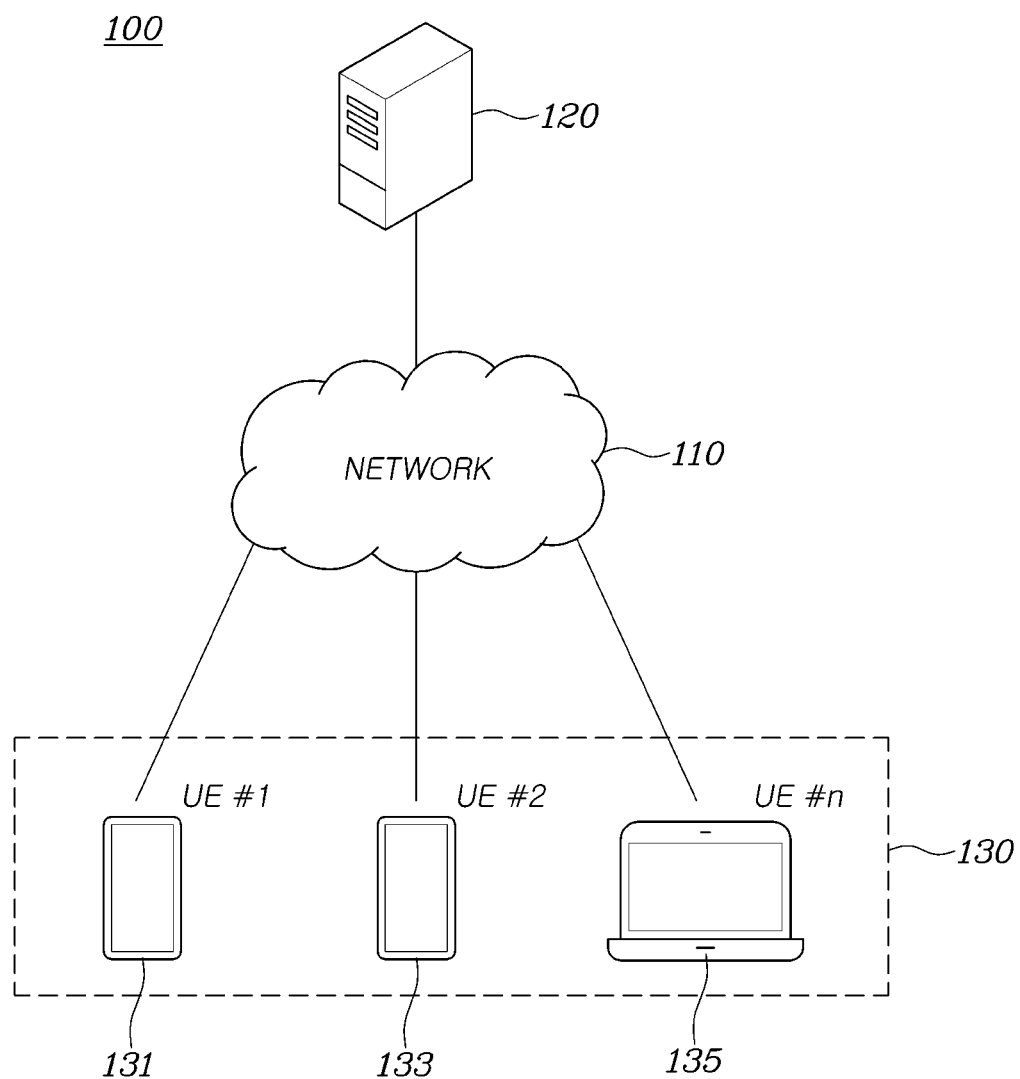
FIG. 1 is a view illustrating a structure of a memory operation system according to an embodiment of the disclosure.

Embodiments of the present invention are now described with reference to the accompanying drawings in such a detailed manner as to be easily practiced by one of ordinary skill in the art. However, the present invention may be implemented in other various forms and is not limited to the embodiments set forth herein. The same or similar reference denotations may be used to refer to the same or similar elements throughout the specification and the drawings. Further, for clarity and brevity, no description is made of well-known functions and configurations in the drawings and relevant descriptions.

The same or similar reference denotations may be used, as applicable, to refer to the same or similar elements throughout the specification and the drawings.

According to an embodiment of the disclosure, there is provided a memory operation device and method for analyzing the cause of a memory leak by extending from a stack trace item having a low-order function invocation to a stack trace item having a high-order function invocation according to whether a memory leak occurs in an electronic device.

According to an embodiment of the disclosure, there is provided a memory operation device and method for switching the memory debugging mode of the processor to be requested for memory analysis among processors running on an electronic device from a ready mode to a profile mode.

According to various embodiments of the disclosure, it is possible to reduce the operation overhead to address a memory leak by performing analysis first on the low-order stack trace and performing analysis the high-order stack trace only on the low-order stack trace causing a memory leak in a memory operation device.

The technical objects of the disclosure are not limited to the foregoing, and other technical objects may be derived by one of ordinary skill in the art from example embodiments of the disclosure.

FIG. 1 is a view illustrating a structure of a network system 100 based on a network environment according to an embodiment of the disclosure.

Referring to FIG. 1, according to an embodiment, a network system 100 may transmit/receive data based on wired or wireless communication between at least one server 120 or one or more user equipments (UEs) 130 based on a network environment.

In an embodiment, the server 120 may be a server providing a streaming service. The streaming service may include a video streaming service that serves various fields or types of videos, e.g., TV shows or sports, to subscribers based on a prepared platform.

In an embodiment, one or more UEs 130 may be electronic devices that may use the streaming service provided based on the platform from the server 120. The plurality of UEs 130 may include, e.g., portable communication devices (e.g., smartphones (UE #1 131 and UE #2 133)), computer devices (e.g., laptop computers (UE #n 135)), portable multimedia devices, portable medical devices, cameras, wearable devices, or home appliances. According to an embodiment of the disclosure, the electronic devices are not limited to those described above.

In an embodiment, the server 120 or the UE 130 may have at least one program installed thereon, and the process for executing the installed program may perform operations according to the scenario defined in the program.

In an embodiment, the server 120 or the UE 130 may dynamically allocate a memory area by the running program and extract low-order stack trace information first to thereby analyze whether a memory leak occurs. The server 120 or the UE 130 may extract next-order stack trace information to analyze whether a memory leak occurs only when it is analyzed that a memory leak occurs through tracing the low-order stack trace information. In this case, the server 120 or the UE 130 may reduce the overhead to extract the stack trace information.

In an embodiment, the server 120 or the UE 130 may switch the debugging mode of the processor to be requested for memory analysis among the run-time processors from a ready mode to a profile mode. In this case, the server 120 or the UE 130 may reduce the used area of the memory without overhead to the central processing unit (CPU).

Figure 2:
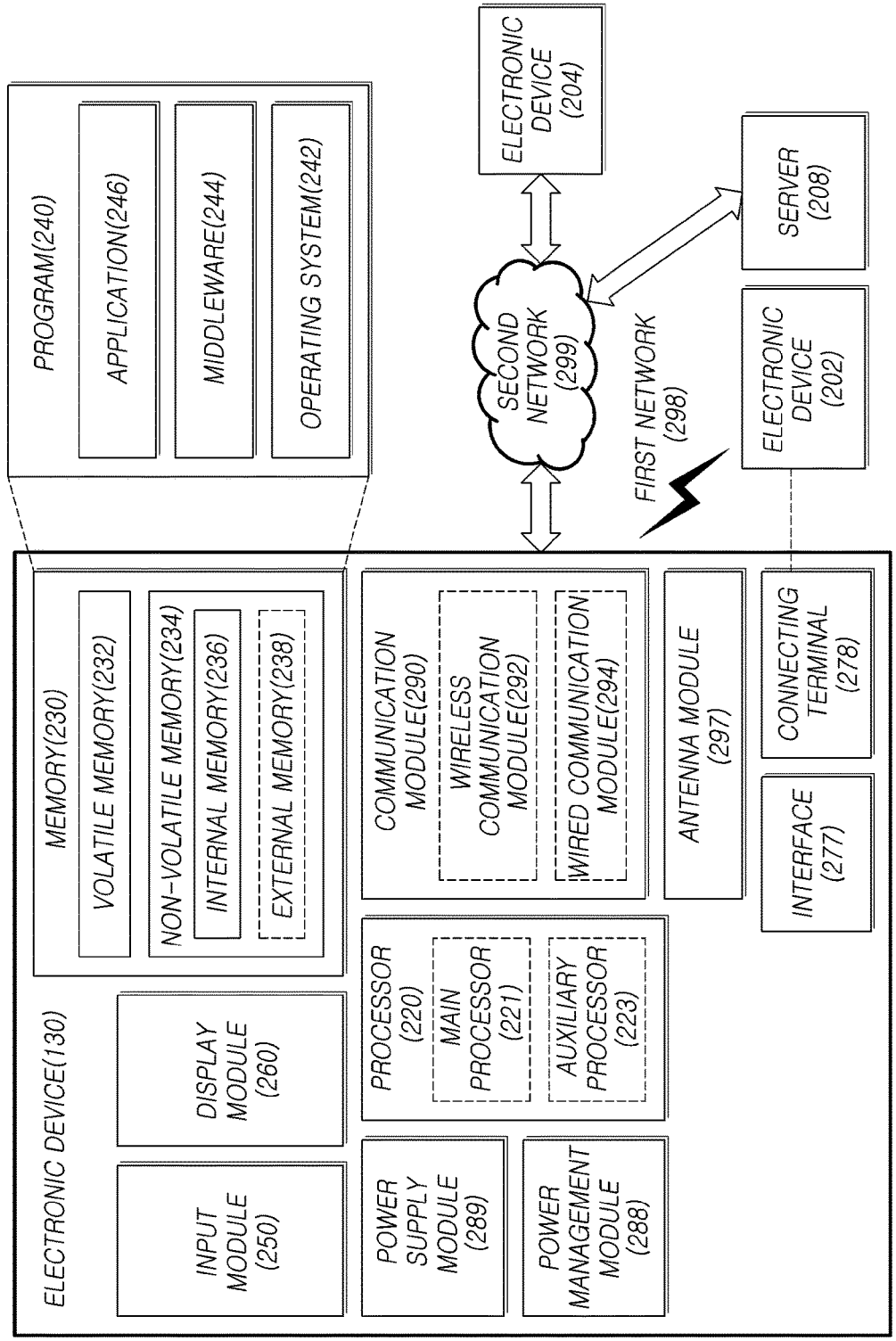
FIG. 2 is a block diagram illustrating a configuration of a memory operation device according to an embodiment of the disclosure.

FIG. 2 is a block diagram illustrating a configuration of an electronic device (e.g., the UE 130 of FIG. 1) in a network environment according to an embodiment of the disclosure.

Referring to FIG. 2, the electronic device 130 in the network environment may communicate with at least one of an electronic device 202 via a first network 298 (e.g., a short-range wireless communication network), or an electronic device 204 or a server 208 via a second network 299 (e.g., a long-range wired or wireless communication network). According to an embodiment, the electronic device 130 may communicate with the electronic device 204 via the server 208 (e.g., the server 120 of FIG. 1). According to an embodiment, the electronic device 130 may include a processor 220, a memory 230, an input module 250, a display module 260, an interface 277, a connecting terminal 278, a power management module 288, a power supply module 289, a communication module 290, or an antenna module 297. In an embodiment, at least one (e.g., the connecting terminal 278) of the components may be omitted from the electronic device 130, or one or more other components may be added in the electronic device 101. According to an embodiment, some (e.g., the antenna module 297) of the components may be integrated into a single component (e.g., the display module 260).

The processor 220 may execute, for example, software (e.g., a program 240) to control at least one other component (e.g., a hardware or software component) of the electronic device 130 coupled with the processor 220, and may perform various data processing or computation. According to one embodiment, as at least part of the data processing or computation, the processor 220 may store a command or data received from another component (e.g., the communication module 290) in the volatile memory 232, process the command or the data stored in the volatile memory 232, and store resulting data in the non-volatile memory 234. According to an embodiment, the processor 220 may include a main processor 221 (e.g., a central processing unit (CPU) or an application processor (AP)), or an auxiliary processor 223 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 130 includes the main processor 221 and the auxiliary processor 223, the auxiliary processor 223 may be configured to use lower power than the main processor 221 or to be specified for a designated function. The auxiliary processor 223 may be implemented as separate from, or as part of the main processor 221.

The auxiliary processor 223 may control at least some of functions or states related to at least one component (e.g., the display module 260 or the communication module 290) among the components of the electronic device 130, instead of the main processor 221 while the main processor 221 is in an inactive (e.g., sleep) state, or together with the main processor 221 while the main processor 221 is in an active state (e.g., executing an application). According to an embodiment, the auxiliary processor 223 (e.g., an image signal processor or a communication processor) may be implemented as part of another component (e.g., the communication module 290) functionally related to the auxiliary processor 123. According to an embodiment, the auxiliary processor 223 (e.g., the neural processing unit) may include a hardware structure specified for artificial intelligence model processing. The artificial intelligence model may be generated via machine learning. Such learning may be performed, e.g., by the electronic device 130 where the artificial intelligence is performed or via a separate server (e.g., the server 208). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

In an embodiment, the program 240 executed by the processor 220 may be stored in the non-volatile memory 234, such as hard disk, and, when started, be loaded on the RAM which is the volatile memory 232 and executed by the computation device of the processor 220. In other words, a memory space may be required to execute the program 240. Declaring local variables or global variables when writing the program 240 in the C language is intended for securing a memory space to be used. As such, there are two methods of providing a memory space to be used by the program 240: memory dynamic allocation and memory static allocation. If a certain program 240 is executed, the operating system 242 allocates a memory space for the execution of the program 240. In this case, the location of the allocated memory space may be divided into a data area, a heap area, and a stack area.

The memory 230 may store various data used by at least one component (e.g., the processor 220) of the electronic device 130. The various data may include, for example, software (e.g., the program 240) and input data or output data for a command related thereto. The memory 230 may include the volatile memory 232 or the non-volatile memory 234.

The program 240 may be stored in the memory 230 as software, and may include, for example, an operating system (OS) 142, middleware 144, or an application 146.

The input module 250 may receive a command or data to be used by other component (e.g., the processor 220) of the electronic device 130, from the outside (e.g., a user) of the electronic device 130. The input module 250 may include, for example, a microphone, a mouse, a keyboard, keys (e.g., buttons), or a digital pen (e.g., a stylus pen).

The display module 260 may visually provide information to the outside (e.g., a user) of the electronic device 130. The display 260 may include, for example, a display, a hologram device, or a projector and control circuitry to control a corresponding one of the display, hologram device, and projector. According to an embodiment, the display 260 may include a touch sensor configured to detect a touch, or a pressure sensor configured to measure the intensity of a force generated by the touch.

The interface 277 may support one or more specified protocols to be used for the electronic device 130 to be coupled with the external electronic device (e.g., the electronic device 202) directly (e.g., wiredly) or wirelessly. According to an embodiment, the interface 277 may include, for example, a high definition multimedia interface (HDMI), a universal serial bus (USB) interface, a secure digital (SD) card interface, or an audio interface.

A connecting terminal 278 may include a connector via which the electronic device 130 may be physically connected with the external electronic device (e.g., the electronic device 202). According to an embodiment, the connecting terminal 278 may include, for example, a HDMI connector, a USB connector, a SD card connector, or an audio connector (e.g., a headphone connector).

The power management module 288 may manage power supplied to the electronic device 130 from an external or internal power source (not shown). According to one embodiment, the power management module 288 may be implemented as at least part of, for example, a power management integrated circuit (PMIC).

The power supply module 289 may supply power to at least one component of the electronic device 130. According to an embodiment, the power supply module 289 may include, for example, a primary cell which is not rechargeable, a secondary cell which is rechargeable, or a fuel cell.

The communication module 290 may support establishing a direct (e.g., wired) communication channel or a wireless communication channel between the electronic device 130 and the external electronic device (e.g., the electronic device 202, the electronic device 204, or the server 208) and performing communication via the established communication channel. The communication module 290 may include one or more communication processors that are operable independently from the processor 220 (e.g., the application processor (AP)) and supports a direct (e.g., wired) communication or a wireless communication. According to an embodiment, the communication module 290 may include a wireless communication module 292 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 204 via a first network 298 (e.g., a short-range communication network, such as Bluetooth™, wireless-fidelity (Wi-Fi) direct, or infrared data association (IrDA)) or a second network 299 (e.g., a long-range communication network, such as a legacy cellular network, a 5G network, a next-generation communication network, the Internet, or a computer network (e.g., local area network (LAN) or wide area network (WAN)). These various types of communication modules may be implemented as a single component (e.g., a single chip), or may be implemented as multi components (e.g., multi chips) separate from each other. The wireless communication module 292 may identify or authenticate the electronic device 130 within a communication network, such as the first network 298 or the second network 299.

The wireless communication module 292 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 292 may support a high-frequency band (e.g., the mmWave band) to achieve, e.g., a high data transmission rate. The wireless communication module 292 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 292 may support various requirements specified in the electronic device 130, an external electronic device (e.g., the electronic device 204), or a network system (e.g., the second network 299). According to an embodiment, the wireless communication module 292 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 297 may transmit or receive a signal or power to or from the outside (e.g., the external electronic device). According to an embodiment, the antenna module 297 may include one antenna including a radiator formed of a conductor or conductive pattern formed on a substrate (e.g., a printed circuit board (PCB)). According to an embodiment, the antenna module 297 may include a plurality of antennas (e.g., an antenna array). In this case, at least one antenna appropriate for a communication scheme used in a communication network, such as the first network 298 or the second network 299, may be selected from the plurality of antennas by, e.g., the communication module 290. The signal or the power may then be transmitted or received between the communication module 290 and the external electronic device via the selected at least one antenna. According to an embodiment, other parts (e.g., radio frequency integrated circuit (RFIC)) than the radiator may be further formed as part of the antenna module 297.

According to various embodiments, the antenna module 297 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 130 and the external electronic device 204 via the server 208 coupled with the second network 299. The external electronic devices 202 or 204 each may be a device of the same or a different type from the electronic device 130. According to an embodiment, all or some of operations to be executed at the electronic device 130 may be executed at one or more of the external electronic devices 202, 204, or 208. For example, if the electronic device 130 should perform a function or a service automatically, or in response to a request from a user or another device, the electronic device 130, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 130. The electronic device 130 may provide the outcome, with or without further processing of the outcome, as at least part of a reply to the request. To that end, a cloud computing, distributed computing, mobile edge computing (MEC), or client-server computing technology may be used, for example. The electronic device 130 may provide ultra low-latency services using, e.g., distributed computing or mobile edge computing. In another embodiment, the external electronic device 204 may include an Internet-of-things (IoT) device. The server 208 may be an intelligent server using machine learning and/or a neural network. According to an embodiment, the external electronic device 204 or the server 208 may be included in the second network 299. The electronic device 130 may be applied to intelligent services (e.g., smart home, smart city, smart car, or health-care) based on 5G communication technology or IoT-related technology.

The following description of the present embodiments focuses primarily on an electronic device (e.g., the electronic device 130 of FIG. 1) where a memory leak may occur. However, an embodiment of the disclosure may likewise apply to various electronic devices, such as servers (e.g., the server 120 of FIG. 1) or home appliances, requiring memory management, as well as the electronic device 130.

According to an embodiment, the electronic device 130 may obtain, identify, or generate items of which the back-trace count is lowest (e.g., items whose back-trace count is 1) (e.g., the item 810 with count 1 in FIG. 8) for all of the items due to execution of at least one program provided. The item with a back-trace count of 1 may be an item for which the function has been invoked by execution of the program. All the items may have various back-trace counts (e.g., k=1, 2, ..., K, where K is the maximum back-trace count). All the items may have a plurality of items including the same function. The electronic device 130 may remove duplicate items corresponding to the same function among the lowest-order items obtained, identified, or generated.

According to an embodiment, the electronic device 130 may extract stack trace information for the lowest-order items (e.g., items with a back-trace count of 1). The electronic device 130 may inspect whether the corresponding item is causing or has caused a memory leak, using the extracted stack trace information and may therethrough identify, extract, or determine items which are suspicious about a memory leak. If an item suspicious about a memory leak among the lowest-order items is identified, extracted, or determined, the electronic device 130 may obtain, identify, or generate the next-order items (e.g., items with a back-trace count of 4) (e.g., the item 820 with count 4 in FIG. 8) related to the lowest-order item suspicious about a memory leak, for all the items. The item with a back-trace count of 4 may correspond to an item for which the function has been invoked four times by execution of the program.

According to an embodiment, the electronic device 130 may extract stack trace information for the next-order items (e.g., items with a back-trace count of 4). The electronic device 130 may inspect whether the corresponding item is causing or has caused a memory leak, using the extracted stack trace information and may therethrough identify, extract, or determine items which are suspicious about a memory leak. If an item suspicious about a memory leak among the next-order items (e.g., back-trace count is 4) is identified, extracted, or determined, the electronic device 130 may obtain, identify, or generate the next-order items (e.g., items with a back-trace count of 10) (e.g., the item 830 with count 10 in FIG. 8) related to the next-order item (e.g., back-trace count is 4) suspicious about a memory leak, for all the items. The item with a back-trace count of 10 may correspond to an item for which the function has been invoked ten times by execution of the program.

According to an embodiment, the electronic device 130 may extract stack trace information for the next-order items (e.g., items with a back-trace count of 10). The electronic device 130 may inspect whether the corresponding item is causing or has caused a memory leak, using the extracted stack trace information and may therethrough identify, extract, or determine items which are suspicious about a memory leak.

By the above-described operation, the electronic device 130 may extract stack trace information about the highest-order item (e.g., the item with a back-trace count of 10) (e.g., the item with count 10 in FIG. 8) included in all the items and identify the final item that has caused the memory leak by using the extracted stack trace information.

Figure 8:
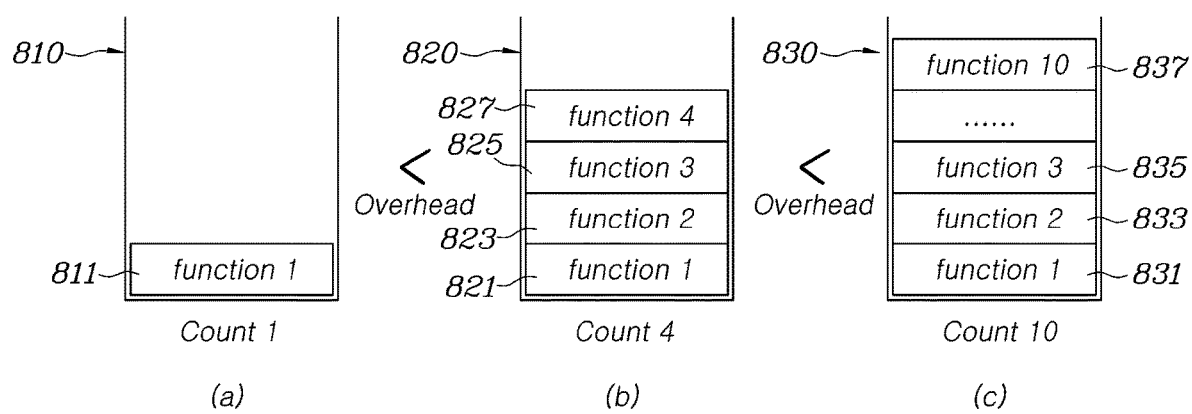
FIG. 8 is a view illustrating a relationship between back-trace count and overhead in an electronic device according to an embodiment of the disclosure.

FIG. 8 is a view illustrating a relationship between back-trace count and overhead in an electronic device (e.g., the electronic device 130 of FIG. 1) according to an embodiment of the disclosure.

Referring to FIG. 8, according to an embodiment, the electronic device 130 may set or determine a target back-trace count to hierarchically inspect a memory leak considering the back-trace count. The target back-trace count for inspecting a memory leak may be set to or determined to be, e.g., 'count 1,' 'count 4,' or 'count 10.' The item 810 with count 1 may identify that the function is invoked once (e.g., function 1 811) (refer to (a) of FIG. 8). The item 820 with count 4 may identify that a function is invoked four times (e.g., function 1 821, function 2 823, function 3 825, and function 4 827) (refer to (b) of FIG. 8). The item 830 with count 10 may identify that the function is invoked ten times (e.g., function 1 831, function 2 833, function 3 835, . . . , function 10 837) (refer to (c) of FIG. 8).

According to an embodiment, the item 820 with count 4 may have a large overhead due to inspection of a memory leak through stack trace as compared with the item 810 with count 1, and the item 830 with count 10 may have a large overhead due to inspection of a memory leak through stack trace as compared with the item 810 with count 1 or the item 820 with count 4. Here, count 1, count 4, or count 10 may correspond to the number of times of function invocation when the electronic device 130 executes the program. As an example, referring to (b) which is the stack structure having count 4, function 2 823 may be invoked in function 1 821, function 3 825 may be invoked in function 2 823, and function 4 827 may be invoked in function 3 825. The information defining such a function invocation relationship may correspond to 'stack trace information.'

Figure 3:
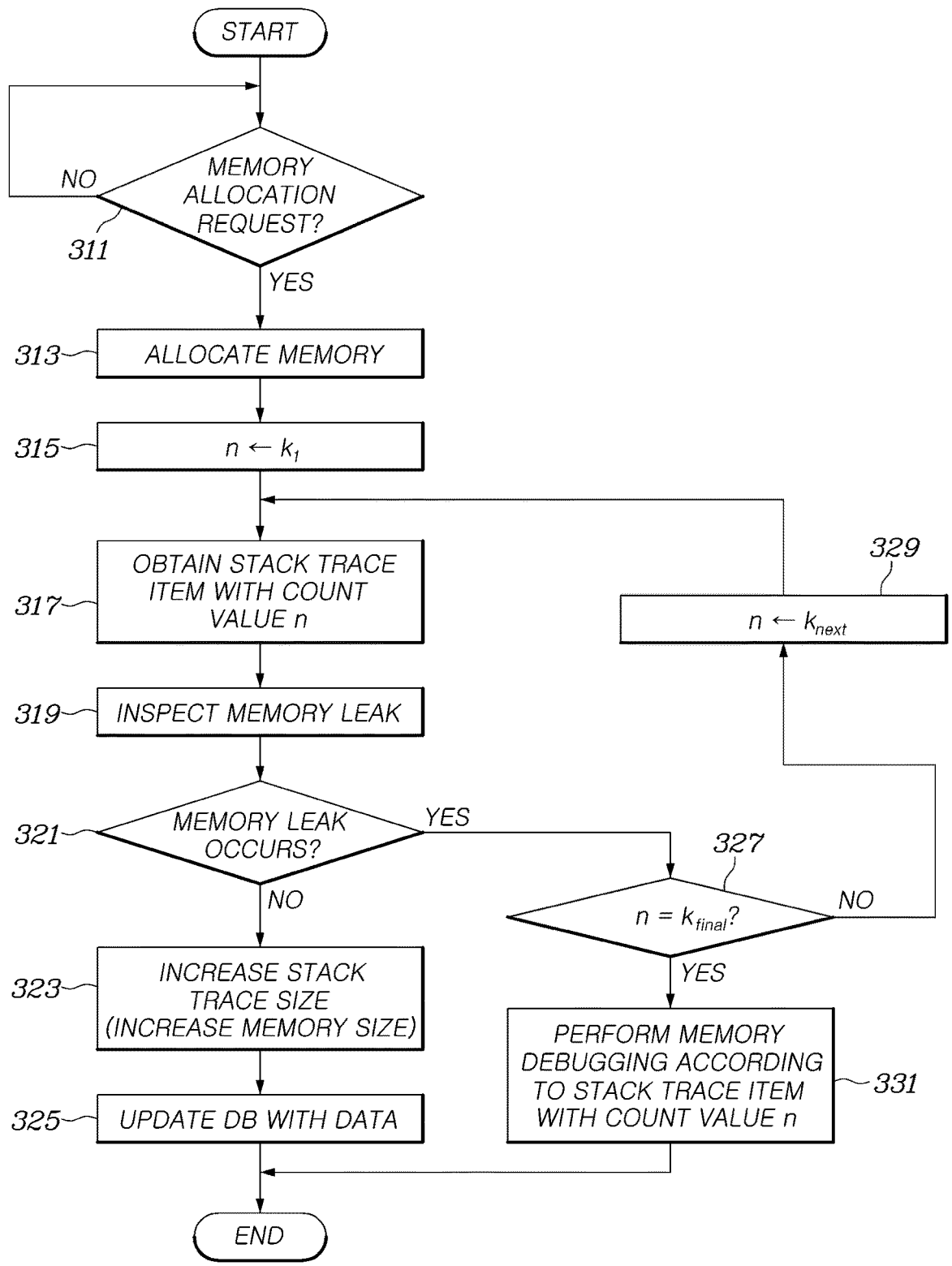
FIG. 3 is a control flowchart illustrating an example of inspecting a memory leak in a memory operation device according to an embodiment of the disclosure.

FIG. 3 is a control flowchart illustrating an example of inspecting a memory leak in an electronic device (e.g., the electronic device 130 of FIG. 1) according to an embodiment of the disclosure.

Referring to FIG. 3, in an embodiment, the electronic device 130 may extract one or more pieces of stack trace information having the lowest order (e.g., the back-trace count is 1) and obtain a memory size allocated for each stack trace in the corresponding processor. When a plurality of processes are currently running, the electronic device 130 may obtain the memory size allocated for each lowest-order stack trace in each of the plurality of processes. In the following description, the target for stack trace to obtain the memory size in the processor is referred to as a 'stack trace item,' the stack trace item having a relatively low order is referred to as a 'lower-order stack trace item,' and the stack trace information having a relatively high order is referred to as a 'higher-order stack trace item.' Further, a stack trace item having the lowest degree may be referred to as a 'lowest degree stack trace item'. It refers to the stack trace item with the highest degree as the 'highest degree stack trace item'.

In an embodiment, the electronic device 130 may analyze the memory cumulative use state using the allocated memory size obtained from the stack trace information corresponding to each lowest-order stack trace item and determine whether a memory leak occurs in the corresponding lowest-order stack trace item by the analysis result. If a specific-order stack trace item (e.g., the back-trace count is 1) causes a memory leak, the electronic device 130 may extract stack trace information about one or more higher-order stack trace items which are next-order (e.g., the back-trace count is 4) stack trace items. The electronic device 130 may obtain the allocated memory size for each higher-order stack trace item in the corresponding processor by using the extracted stack trace information. If a plurality of pieces of stack trace information are extracted for the higher-order stack trace items, the electronic device 130 may obtain the allocated memory size by each of the plurality of pieces of stack trace item. In other words, the electronic device 130 may determine whether to extract the next-order stack trace information considering whether a memory leak occurs, reducing the number of target stack trace items where the stack trace information is to be extracted. In this case, the electronic device 130 may reduce the overhead to extract the stack trace information.

In an embodiment, the electronic device 130 may analyze the memory cumulative use state using the allocated memory size obtained for each higher-order stack trace item and determine whether a memory leak occurs in the corresponding higher-order stack trace item by the analysis result. If a memory leak occurs in the corresponding higher-order stack trace item, the electronic device 130 may determine whether the higher-order stack trace item where the memory leak occurs is the highest-order stack trace item. In this case, if the higher-order stack trace item where the memory leak occurs is not the highest-order stack trace item, the electronic device 130 may further determine whether a memory leak occurs in one or more higher-order stack trace items which are next-order (e.g., the back-trace count is 10) stack trace items. If the higher-order stack trace item where the memory leak occurs is otherwise the highest-order stack trace item, the electronic device 130 may analyze that the memory leak is induced by the higher-order stack trace item where the memory leak occurs.

More specifically, in operation 311, the electronic device 130 may monitor whether a memory allocation request is generated. The memory allocation request may be generated by one of static allocation that requests allocation of a memory area determined in the step of creating the program or dynamic allocation that requests allocation of a memory area to fit the data input while the program is running using a heap area. The static allocation may be used in allocation for previously fixing the size of a necessary memory area when the program runs or when a limit size of the memory area to be allocated is known such as when declaring a variable or array. The dynamic allocation may be efficient because it is possible to simultaneously allocate many memory areas and use them in an array. Even when the array size is not pre-known, it is possible to allocate and process an appropriate size of memory area while the program is running by using the dynamic allocation. As the order of dynamic allocation, a variable to be dynamically allocated a memory area is declared by means of a pointer, and a memory area is dynamically allocated by a memory allocation request function (e.g., malloc (*), calloc (*), or realloc (*)), and if use of the memory area is ended, allocation of the memory area may be released by a memory allocation release function (e.g., free (*)).

In an embodiment, if the memory allocation request is generated, the electronic device 130 may allocate a memory area in the requested size in operation 313. The electronic device 130 may process the data input while the process or program is running, using the allocated memory area.

In an embodiment, in operation 315, the electronic device 130 may set index n, which indicates the order of the invocation function to be had by the stack trace item for which the memory leak is to be inspected to k1, the initial value, in inspection target set K (={$k_1$, $k_2$ . . . , $k_m$ . . . , $k_{final}$}). For example, the test target set K may be {1, 4, 10}.

In an embodiment, in operation 317, the electronic device 130 may extract stack trace information where the stack trace count, i.e., the order of invocation function, is n (=$k_1$). The electronic device 130 may obtain one or more stack trace items corresponding to the extracted stack trace information where the order of invocation function is n (=$k_1$).

In an embodiment, in operation 319, the electronic device 130 may inspect whether a memory leak occurs in one or more stack trace items through tracing the stack trace information where the order of invocation function is n (=$k_1$).

In an embodiment, in operation 321, the electronic device 130 may determine whether there is a stack trace item where a memory leak occurs among one or more stack trace items corresponding to the stack trace information where the order of invocation function is n (=$k_1$). If there is a stack trace item where a memory leak occurs, the electronic device 130 may perform operation 327 and, unless there is a stack trace information where a memory leak occurs, perform operation 323.

In an embodiment, in operation 323, the electronic device 130 may allocate an additional memory area to increase the stack trace size. In operation 325, the electronic device may update the database (DB) with the data regarding the items for which additional memory allocation has been made.

In an embodiment, in operation 327, the electronic device 130 may determine whether the order n of invocation function, which is previously inspected as to whether a memory leak occurs, is the last order ($k_{final}$) of invocation function included in the inspection target set K. If the order n of invocation function inspected is the last order ($k_{final}$) of invocation function, the electronic device 130 may perform operation 331 and, if the order n of invocation function inspected is not the last order ($k_{final}$) of invocation function, perform operation 329.

In an embodiment, in operation 329, the electronic device 130 may change the order n of invocation function, which is previously inspected as to whether a memory leak occurs, into the next order ($k_{next}$) of invocation function included in the inspection target set K. In operations 317 to 321, the electronic device 130 may extract stack trace information (stack trace information about the changed order n of invocation function) where the order of invocation function has been increased and analyze whether a memory leak occurs in the higher-order stack trace item.

In an embodiment, if the electronic device 130 may extract stack trace information using all the invocation function orders included in the inspection target set K and analyzes whether a memory leak occurs, the electronic device 130 may perform memory debugging on the highest-order stack trace item where a memory leak occurs in operation 331.

As described above, the electronic device 130 may determine whether a memory leak occurs in one or more low-order stack trace items with a count value of n among the collected stack trace items and, if there is a low-order stack trace item causing a memory leak, determine whether a memory leak occurs in one or more high-order stack trace items with a count value of m. Here, n is a positive integer, and m is a positive integer larger than n. When m is the maximum count value, the electronic device 130 may perform memory debugging using the high-order stack trace item causing the memory leak.

Figure 4:
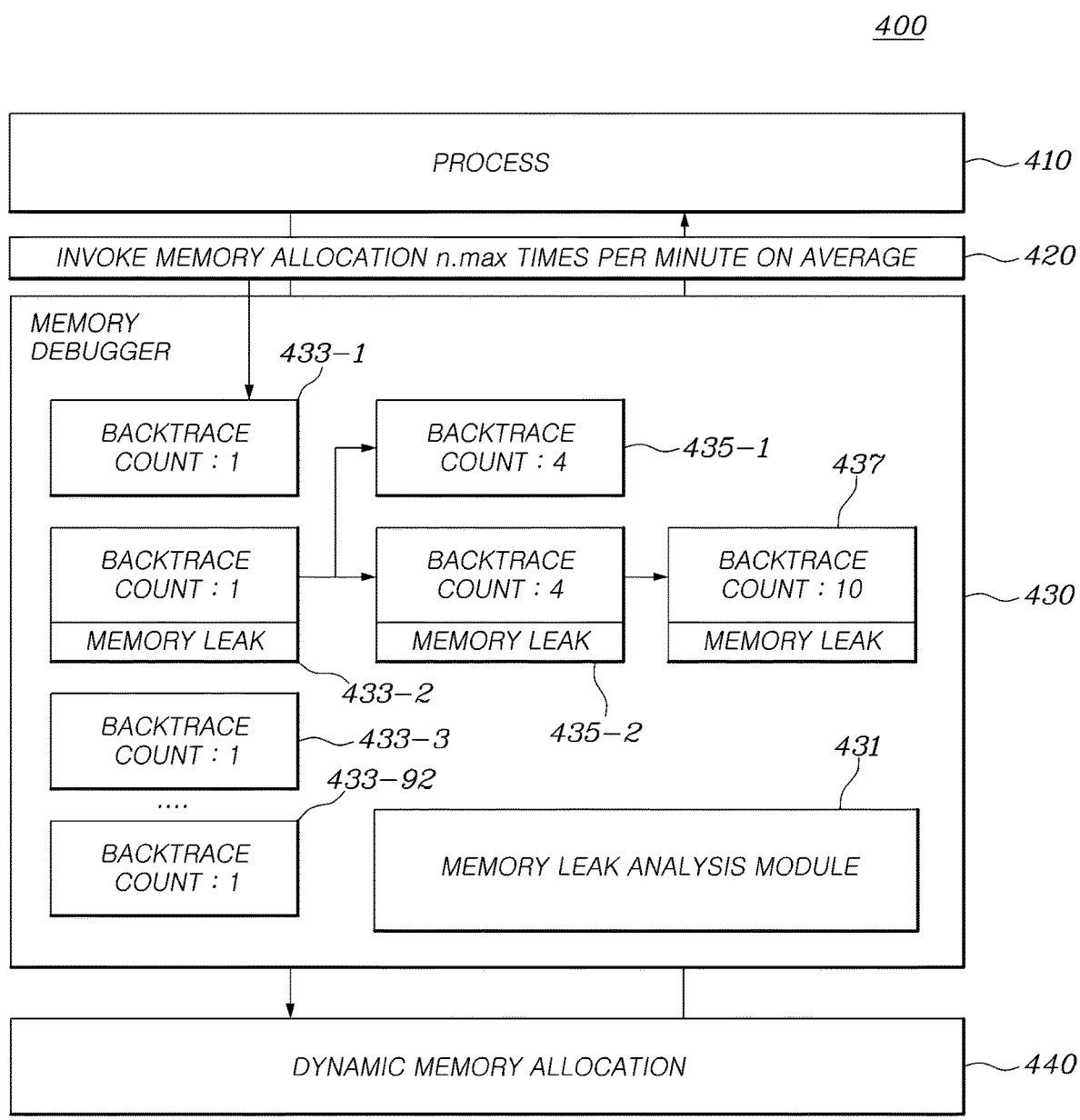
FIG. 4 is a function block diagram illustrating an example of inspecting a memory leak in a memory operation device according to an embodiment of the disclosure.

FIG. 4 is a function block diagram illustrating an example of inspecting a memory leak in a memory operation device according to an embodiment of the disclosure.

Referring to FIG. 4, according to an embodiment, a memory operation device 400 involving a memory operation of allocating or releasing a memory area in an electronic device (e.g., the electronic device 130 of FIG. 1) may include a process 410, a memory debugging module 430, a memory leak analysis module 431, or a dynamic memory allocation module 440. The memory leak analysis module 431 may be provided as an internal component included in the memory debugging module 430 or be provided as a separate external component, but may not be limited thereto.

In an embodiment, the process 410 may perform the overall operation for processing data or signals based on a corresponding program. The process 410 may run into a memory allocation requesting function (e.g., a dynamic memory allocation requesting function, such as malloc (*), calloc (*), or realloc (*)) when performing a procedure by the functions defined in the program. In this case, the process 410 may generate an invocation to request memory allocation in a designated size. The memory allocation invocation by the process 410 may be transferred to the dynamic memory allocation module 440. The dynamic memory allocation module 440 may allocate a memory area in a necessary size in response to the memory allocation invocation from the process 410.

In an embodiment, if a threshold number (e.g., 1.5 millions) of, or more, memory allocation requests occur, the operation performance may be deteriorated due to the overhead to extract the stack trace information when the invocation path order that may be generated in proportion to the number of times the function is invoked is the maximum. In this case, the processor 410 may first identify whether a memory leak occurs by extracting stack trace information where the invocation path order is low and, upon identifying that a memory leak occurs therethrough, extract stack trace information for the next order. In this case, it is possible to reduce the overhead to extract high-order stack trace information where the invocation path order is high.

In an embodiment, the memory leak analysis module 431 may analyze the memory cumulative use state of the stack traces using the stack trace information about a specific invocation path order (e.g., the back-trace count is one of 1, 4, or 10) collected by the memory debugging module 430. The specific invocation path order may sequentially increase whenever occurrence of a memory leak is identified. For example, the memory leak analysis module 431 may analyze whether a memory leak occurs for the lowest-order stack trace items using the stack trace information where the back-trace count is 1, collected by the memory debugging module 430. As a result of the analysis, if a memory leak occurs, the memory leak analysis module 431 may analyze whether a memory leak occurs for higher-order stack trace items using the stack trace information where the back-trace count is 4, collected by the memory debugging module 430. According to the above-described operation, the memory leak analysis module 431 may analyze whether a memory leak occurs up to the highest-order stack trace item. In this case, the memory leak analysis module 431 may limit analysis of occurrence of a memory leak to some higher-order stack trace items only when a memory leak occurs in a lower-order stack trace item, rather than performing analysis on all orders of stack trace items.

In an embodiment, the memory leak analysis module 431 may identify whether a memory leak occurs in each stack trace based on the analysis result of the memory cumulative use state. For example, upon determining that a specific stack trace causes a memory leak, the memory leak analysis module 431 may assign an identifier indicating that the stack trace has caused a memory leak. The memory leak may occur as the allocated memory areas are accumulated without being released over time. The conditions of the memory leak may vary depending on, e.g., the environment or contexts.

In an embodiment, if an invocation to request memory allocation occurs from a specific program being executed by the process 410, the dynamic memory allocation module 440 may simultaneously allocate many memory areas for the specific program and thus be efficient. The dynamic memory allocation module 440 may allocate and process a memory area in an appropriate size while the program is running even when it cannot be aware of the array size for allocation of a memory area. The dynamic memory allocation module 440 may perform dynamic allocation according to the order of declaring a variable to be dynamically allocated a memory area by means of a pointer, dynamically allocating a memory area by a memory allocation request function (e.g., malloc (*), calloc (*), or realloc (*)), and if use of the memory area is ended, releasing allocation of the memory area by a memory allocation release function (e.g., free (*)). Information about allocation of a memory area by the dynamic memory allocation module 440 may be recorded, as stack trace information for stack trace, in the descriptive area (e.g., stack area) of the memory.

In an embodiment, if a memory leak occurs in a low-order stack trace item, the memory debugging module 430 may perform trace on the higher-order stack trace item by increasing the depth count indicating the order of the invocation.

In an embodiment, the memory debugging module 430 may first trace the stack trace item whose depth count indicating the order of function invocation is low order, in conjunction with the memory leak analysis module 431. The memory debugging module 430 may first collect, e.g., the lowest-order stack trace information and transfer it to the memory leak analysis module 431 to analyze whether a memory leak occurs in the lowest-order stack trace item. If a memory leak occurs in the lowest-order stack trace item, the memory debugging module 430 may extract higher-order stack trace information that may be associated with or derived from the lowest-order stack trace item where the memory leak occurs and transfer the extracted higher-order stack trace information to the memory leak analysis module 431 to analyze whether a memory leak occurs in the higher-order stack trace item. In this case, the memory debugging module 430 need not extract all highest-order stack trace information and thus reduce overhead due to stack trace.

More specifically, if a threshold number (e.g., 1.5 million per minute) of or more memory allocation requests occur in a specific process, the memory debugging module 430 may extract one or more pieces of stack trace information with the lowest order (e.g., the back-trace count is 1) and obtain the memory size allocated per lowest-order stack trace item 433-1, 433-2, 433-3, and 433-k.

The memory debugging module 430 may analyze the memory cumulative use state by using the allocated memory size obtained for each lowest-order stack trace item 433-1, 433-2, 433-3, and 433-k. The memory debugging module 430 may determine, e.g., that a memory leak occurs in a specific lowest-order stack trace item (e.g., the lowest-order stack trace item 433-2) and no memory leak occurs in the other lowest-order stack trace items 433-1, 433-3, and 433-k, as a result of analysis. In this case, the memory debugging module 430 may extract stack trace information about one or more higher-order stack trace items 435-1 and 435-2 which are next-order (e.g., the back-trace count is 4) stack trace items. The memory debugging module 430 may obtain the memory size allocated per higher-order stack trace item 435-1 and 435-2 using the extracted stack trace information.

The memory debugging module 430 may analyze the memory cumulative use state by using the allocated memory size obtained for each higher-order stack trace item 435-1 and 435-2. The memory debugging module 430 may determine whether a memory leak occurs in a specific higher-order stack trace item (e.g., the higher-order stack trace item 435-2) as a result of analysis. In this case, the memory debugging module 430 may extract stack trace information about one or more higher-order stack trace items 437 which are next-order (e.g., the back-trace count is 10) stack trace items. The memory debugging module 430 may obtain the memory size allocated per higher-order stack trace item 437 using the extracted stack trace information.

The memory debugging module 430 may analyze the memory cumulative use state by using the allocated memory size obtained for the higher-order stack trace item 437. The memory debugging module 430 may determine whether a memory leak occurs in the higher-order stack trace item 437 as a result of analysis. For example, if a memory leak occurs in the corresponding higher-order stack trace item 437, the memory debugging module 430 may determine whether the higher-order stack trace item 437 is the highest-order stack trace item.

Unless the higher-order stack trace item 437 where a memory leak occurs is the highest-order stack trace item, the memory debugging module 430 may additionally determine whether a memory leak occurs in one or more higher-order stack trace items which are next-order stack trace items. When the higher-order stack trace item 437 where a memory leak occurs is the highest-order stack trace item, the memory debugging module 430 may predict that the higher-order stack trace item 437 where a memory leak occurs is the final stack trace causing the memory leak.

Figure 5:
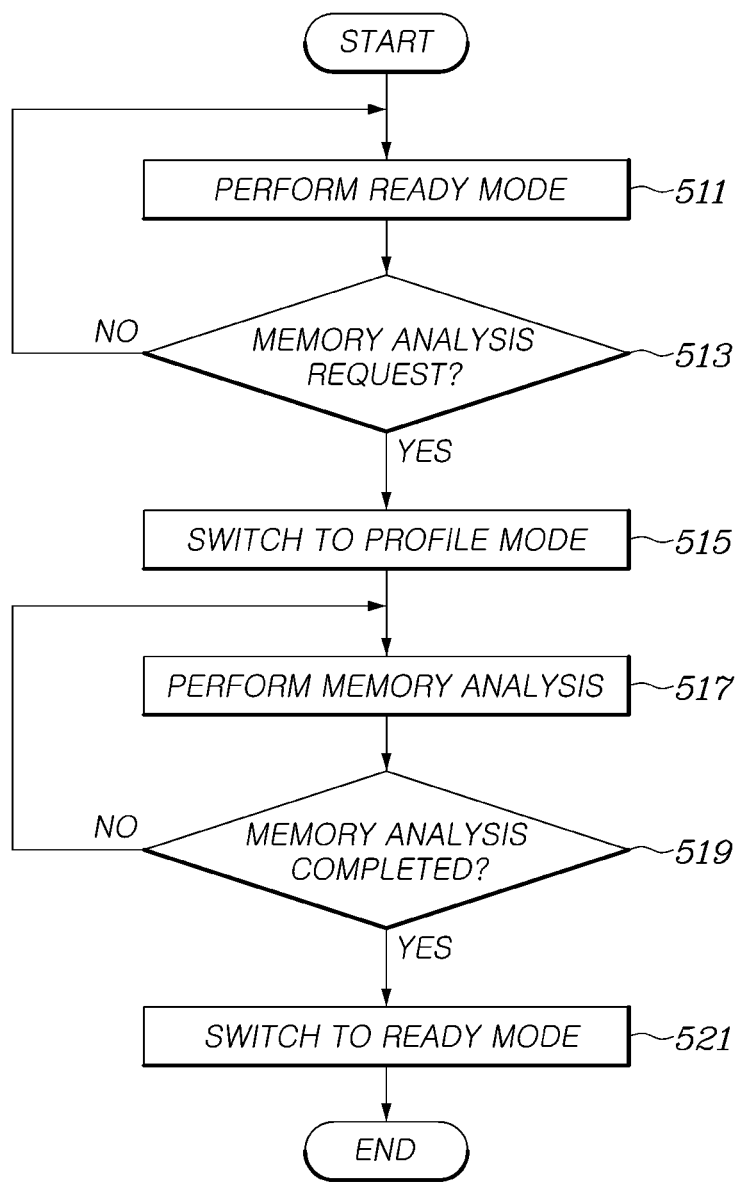
FIG. 5 is a control flowchart illustrating an example of controlling an operation mode for each process in a memory operation device according to an embodiment of the disclosure.

FIG. 5 is a control flowchart illustrating an example of controlling an operation mode for each process in a memory operation device (e.g., the memory operation device 600 of FIG. 6) according to an embodiment of the disclosure.

Referring to FIG. 5, in an embodiment, in operation 511, the memory operation device 600 may operate in ready mode. The memory operation device 600 may include, e.g., a plurality of memory operation modules (e.g., memory operation module A 610A, memory operation module B 610B, memory operation module C 610C, and memory operation module D 610D of FIG. 6). In this case, some of the memory operation modules (e.g., memory operation module A 610A, memory operation module B 610B, memory operation module C 610C, and memory operation module D 610D of FIG. 6) included in the memory operation device 600 may operate in ready mode, and others may operate in profile mode. For example, in operation 511, the operation in ready mode may be performed only by memory operation modules in ready mode.

In an embodiment, in operation 513, the memory operation device 600 may determine whether a memory analysis request occurs. For example, when the memory operation device 600 includes a plurality of memory operation modules (e.g., memory operation module A 610A, memory operation module B 610B, memory operation module C 610C, and memory operation module D 610D of FIG. 6), a memory analysis request module (e.g., the memory analysis request module 620 of FIG. 6) may transfer a memory analysis request to at least one memory operation module among some memory operation modules operating in ready mode.

In an embodiment, some memory operation modules included in the memory operation device 600 receiving the memory analysis request may switch from ready mode to profile mode through a state transition in operation 515. The memory operation module state-transitioned into profile mode may perform memory analysis in operation 517 and determine whether memory analysis is completed in operation 519. If the memory analysis is completed, the corresponding memory operation module may switch from profile mode to ready mode through state transition in operation 521.

Figure 6:
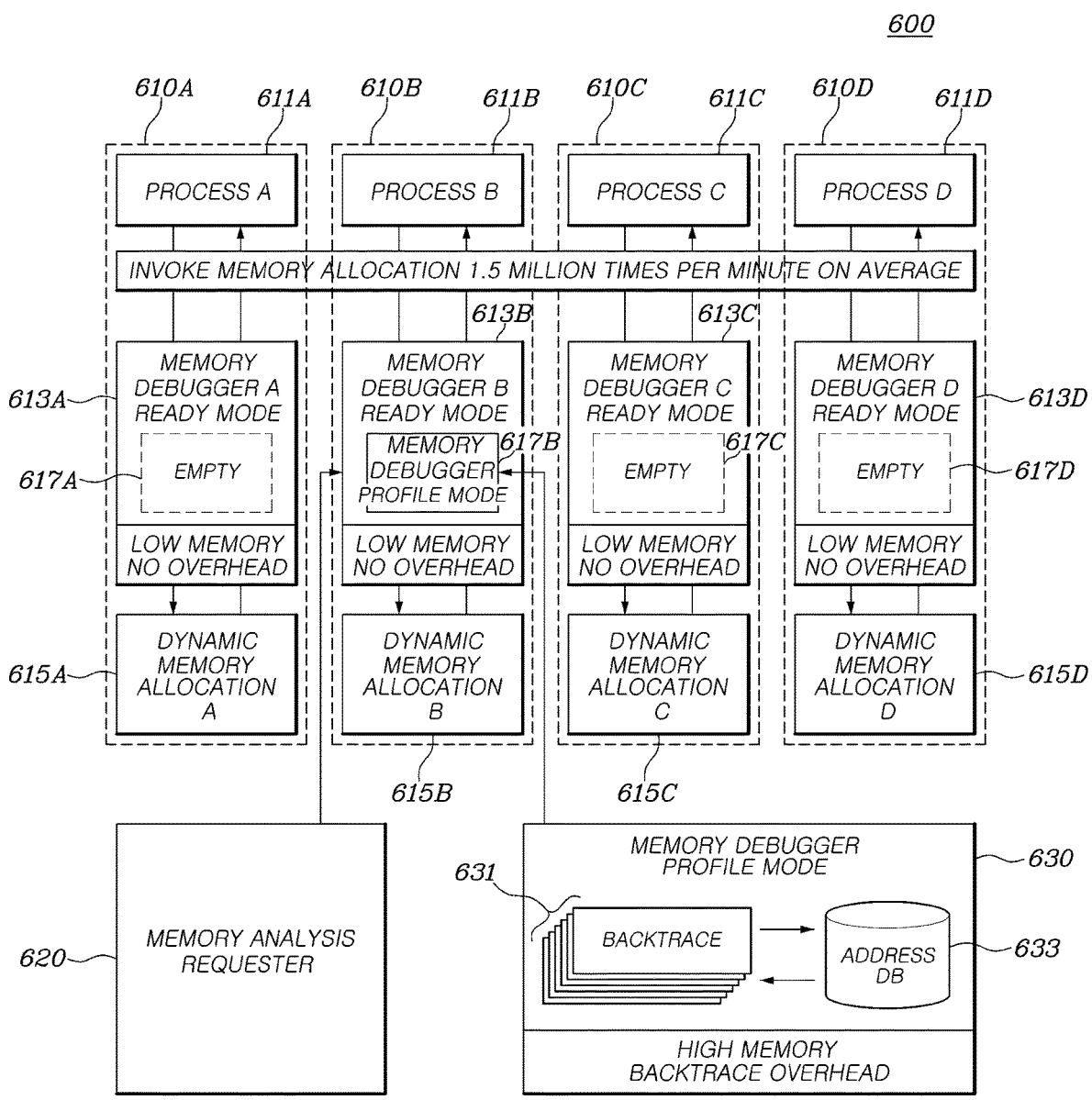
FIG. 6 is a function block diagram illustrating an example of controlling an operation mode for each process in a memory operation device according to an embodiment of the disclosure.

FIG. 6 is a function block diagram illustrating an example of controlling an operation mode for each process in a memory operation device 600 according to an embodiment of the disclosure.

Referring to FIG. 6, in an embodiment, the memory operation device 600 may include memory operation modules (e.g., memory operation module A 610A, memory operation module B 610B, memory operation module C 610C, and memory operation module D 610D) that may perform memory debugging for each of a plurality of processes (e.g., process A 611A, process B 611B, process C 611C, and process D 611D) running on the electronic device (e.g., the UE 130 of FIG. 1). The memory operation device 600 may further include a memory analysis request module 620 or a memory debugger 630.

In an embodiment, memory operation module A 610A, memory operation module B 610B, memory operation module C 610C, and memory operation module D 610D may include processes (e.g., process A 611A, process B 611B, process C 611C, and process D 611D), memory debuggers (e.g., memory debugger A 613A, memory debugger 630 B 613B, memory debugger C 613C, and memory debugger D 613D) or dynamic memory allocation modules (e.g., dynamic memory allocation module A 615A, dynamic memory allocation module B 615B, dynamic memory allocation module C 615C, and dynamic memory allocation module D 615D). Memory operation module A 610A, memory operation module B 610B, memory operation module C 610C, or memory operation module D 610D may have the same configuration/perform the same operation as those described above with reference to FIG. 4, for example.

In an embodiment, memory debugger A 613A, memory debugger B 613B, memory debugger C 613C, or memory debugger D 613D included in memory operation module A 610A, memory operation module B 610B, memory operation module C 610C, or memory operation module D 610D may be executed together with process A 611A, process B 611B, process C 611C, or process D 611D when process A 611A, process B 611B, process C 611C, or process D 611D is executed.

In an embodiment, considering the CPU or memory area that should basically be used by the memory debuggers 613A, 613B, 613C, and 613D, connecting memory debuggers to all the processes (e.g., process A 611A, process B 611B, process C 611C, and process D 611D) included in the memory operation device 600 may deteriorate memory debugging performance. Thus, in an embodiment for preventing deterioration of memory debugging performance, some of memory operation module A 610A, memory operation module B 610B, memory operation module C 610C, or memory operation module D 610D may be operated in ready mode, and others may be operated in profile mode. The memory operation modules in ready mode may operate only with conditions essential for memory debugging. The memory operation modules in profile mode may perform memory analysis according to substantial profile functions of memory debugging.

In an embodiment, the memory analysis request module 620 may send a memory analysis request to the process included in the memory operation module that desires activation of memory debugging function during runtime operation. The memory analysis request module 620 may exist in various forms, such as a process daemon, specific configuration file, or process itself.

In an embodiment, the memory debugger 630 may include a plurality of stack traces 631 or a database (DB) 633 managing address information according to memory allocation. The memory debugger 630 may be connected to the process included in the memory operation module requested for memory analysis by the memory analysis request module 620 to start memory analysis in the memory operation module.

Figure 7:
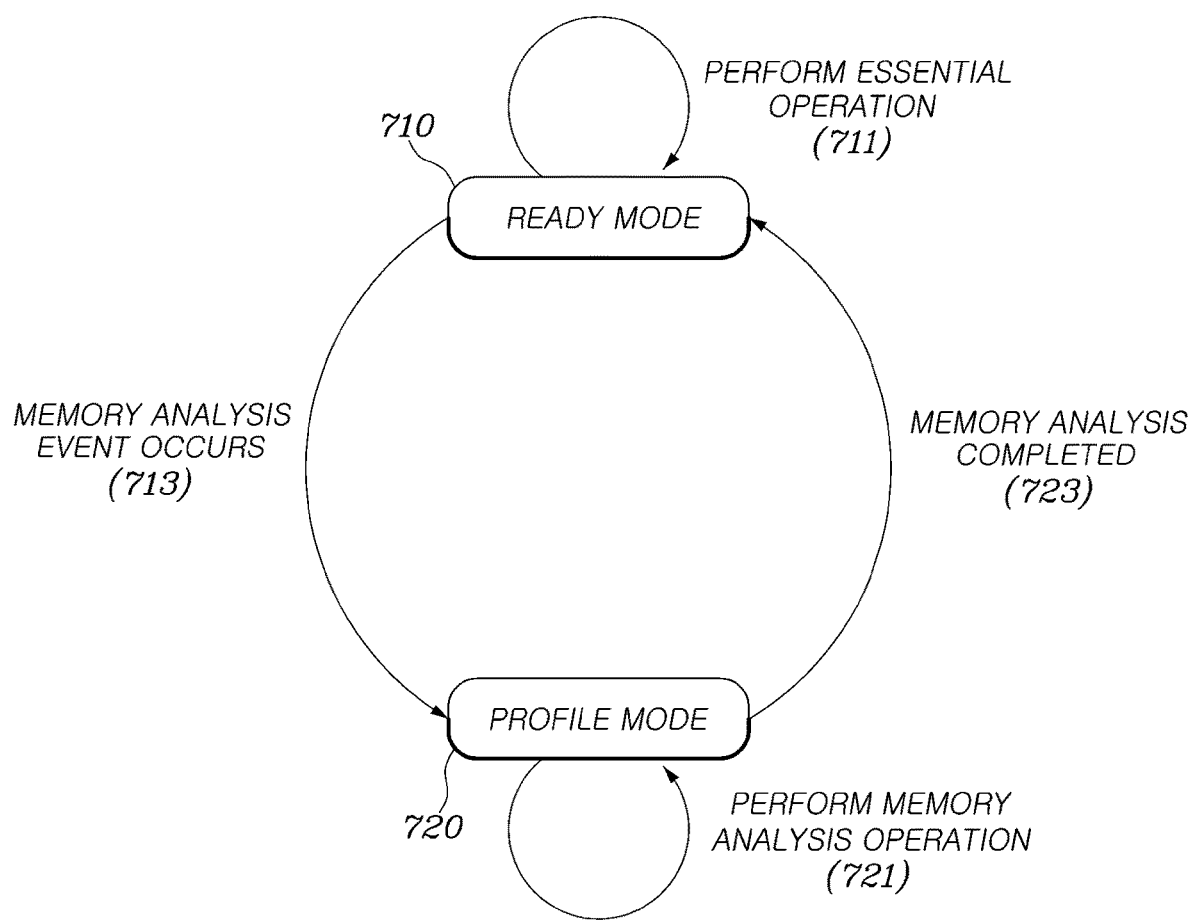
FIG. 7 is a state transition view illustrating an example of controlling an operation mode for each process in a memory operation device according to an embodiment of the disclosure.

FIG. 7 is a state transition view illustrating an example of controlling an operation mode for each process in a memory operation device according to an embodiment of the disclosure; and Referring to FIG. 7, in an embodiment, at least one process among a plurality of processes (e.g., process A 611A, process B 611B, process C 611C, and process D 611D of FIG. 6) running on the electronic device 130 may operate in ready mode 710, and the other processes may operate in profile mode 720. The process in ready mode 710 may operate only with conditions essential for memory debugging (operation 711). In this case, the process in ready mode 710 may operate only with the minimum memory without overhead in the CPU. The process in profile mode 720 may perform memory analysis according to substantial profile functions of memory debugging (operation 721).

In an embodiment, at least one process operating in ready mode 710 among the plurality of processes (e.g., process A 611A, process B 611B, process C 611C, and process D 611D of FIG. 6) running on the electronic device 130 may state-transition from ready mode 710 to profile mode 720 if a memory analysis event occurs in operation 713.

In an embodiment, at least one process operating in profile mode 720 among the plurality of processes (e.g., process A 611A, process B 611B, process C 611C, and process D 611D of FIG. 6) running on the electronic device 130 may state-transition from profile mode 720 to ready mode 710 if a memory analysis complete event occurs in operation 723.

The electronic device according to various embodiments of the disclosure may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program #40) including one or more instructions that are stored in a storage medium (e.g., internal memory #36 or external memory #38) that is readable by a machine (e.g., the electronic device #01). For example, a processor (e.g., the processor #20) of the machine (e.g., the electronic device #01) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program products may be traded as commodities between sellers and buyers. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. Some of the plurality of entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

What is claimed is:

1. A method for operating a memory in an electronic device, comprising:
   determining whether a memory leak occurs in one or more low-order stack trace items with a count value of n among collected stack trace items, n being a positive integer; and
   based on a low-order stack trace item among the one or more low-order stack trace items being determined as causing the memory leak, proceeding to a next order of the collected stack trace items to thereby determine whether a memory leak occurs in one or more high-order stack trace items with a count value of m which is a positive integer higher than n,
   wherein, when m is a maximum count value among the collected stack trace items, memory debugging is performed using a high-order stack trace item, among the one or more high-order stack trace items, causing the memory leak.

2. The method of claim 1, further comprising:
   in response to a memory allocation request being invoked equal to or greater than a preset number of times, obtaining a memory size allocated for the one or more low-order stack trace items or the one or more high-order stack trace items to determine whether the memory leak occurs.

3. The method of claim 2, further comprising initializing the number of times in which the memory allocation request is invoked at a predetermined cycle.

4. The method of claim 1, further comprising assigning an indicator indicating a stack trace item causing the memory leak to the low-order stack trace item causing the memory leak.

5. The method of claim 1, wherein the maximum count value is a maximum number of functions invoked at a memory allocation request.

6. The method of claim 1, wherein the maximum count value is a minimum number of functions required to determine a cause of the memory leak.

7. The method of claim 1, further comprising:
   determining a target processor requiring memory analysis among a plurality of processors; and
   switching from a ready mode in which a memory debugger included in the target processor has an essential condition for debugging to a profile mode in which a profile function is included to perform the memory analysis.

8. An electronic device, comprising:
   a memory configured to include a stack area or a heap area; and
   at least one processor configured to perform dynamic memory allocation on the memory and analyze a cause of a memory leak based on stack trace,
   wherein the at least one processor is configured to:
      determine whether a memory leak occurs in one or more low-order stack trace items with a count value of n among collected stack trace items, n being a positive integer; and
      based on a low-order stack trace item among the one or more low-order stack trace items being determined as causing the memory leak, proceeding to a next order of the collected stack trace items to thereby determine whether a memory leak occurs in one or more high-order stack trace items with a count value of m which is a positive integer higher than n,
      wherein when m is a maximum count value among the collected stack trace items, memory debugging is performed using a high-order stack trace item, among the one or more high-order stack trace items, causing the memory leak.

9. The electronic device of claim 8, wherein the at least one processor is configured to in response to a memory allocation request being invoked equal to or greater than a preset number of times, obtain a memory size allocated for the one or more low-order stack trace items or the one or more high-order stack trace items to determine whether the memory leak occurs.

10. The electronic device of claim 9, wherein the at least one processor is configured to initialize the number of times in which the memory allocation request is invoked at a predetermined cycle.

11. The electronic device of claim 9, wherein the at least one processor is configured to assign an indicator indicating a stack trace item causing the memory leak to the low-order stack trace item causing the memory leak.

12. The electronic device of claim 8, wherein the maximum count value is a maximum number of functions invoked at a memory allocation request.

13. The electronic device of claim 8, wherein the maximum count value is a minimum number of functions required to determine a cause of the memory leak.

14. The electronic device of claim 8, wherein the at least one processor is configured to determine a target processor requiring memory analysis among a plurality of processors and switch from a ready mode in which a memory debugger included in the target processor has an essential condition for debugging to a profile mode in which a profile function is included to perform the memory analysis.

15. An electronic device, comprising:
   a memory leak analysis module configured to determine whether a memory leak occurs in a stack trace item; and
   a memory debugger configured to perform memory debugging based on a result of determining whether the memory leak occurs by the memory leak analysis module,
   wherein the memory leak analysis module is configured to:
      determine whether a memory leak occurs in one or more low-order stack trace items with a count value of n among collected stack trace items, n being a positive integer; and,
      based on a low-order stack trace item among the one or more low-order stack trace items being determined as causing the memory leak, proceeding to a next order of collected stack trace items to thereby determine whether a memory leak occurs in one or more high-order stack trace items with a count value of m which is a positive integer higher than n,
      wherein when m is a maximum count value among the collected stack trace items, the memory debugger configured to perform memory debugging using a high-order stack trace item, among the one or more high-order stack trace items, causing the memory leak.

16. The electronic device of claim 15, wherein the memory leak analysis module is configured to initialize the number of times in which the memory allocation request is invoked at a predetermined cycle; and in response to the memory allocation request being invoked equal to or greater than a preset number of times, obtain a memory size allocated for the one or more low-order stack trace items or the one or more high-order stack trace items to determine whether the memory leak occurs.

17. The electronic device of claim 15, wherein the memory leak analysis module is configured to assign an indicator indicating a stack trace item causing the memory leak to the low-order stack trace item causing the memory leak.

18. The electronic device of claim 15, wherein the maximum count value is a maximum number of functions invoked at a memory allocation request.

19. The electronic device of claim 15, wherein the maximum count value is a minimum number of functions required to determine a cause of the memory leak.

20. The electronic device of claim 15, wherein the memory leak analysis module is configured to determine a target processor requiring memory analysis among a plurality of processors and switch from a ready mode in which a memory debugger included in the target processor has an essential condition for debugging to a profile mode in which a profile function is included to perform the memory analysis.

* * * * *